United States Patent

Higbee et al.

[11] 3,963,193
[45] June 15, 1976

[54] FACE CLUTCH VEHICLE SENSITIVE INERTIAL RETRACTORS

[75] Inventors: Wallace Carson Higbee, Romeo; Ronald Albert Willey, Port Huron, both of Mich.

[73] Assignee: The Firestone Tire & Rubber Company, Akron, Ohio

[22] Filed: Apr. 12, 1974

[21] Appl. No.: 460,336

[52] U.S. Cl. .................................. 242/107.4 A
[51] Int. Cl.² ................... A62B 35/02; B65H 75/48
[58] Field of Search .................... 242/107.4 A; 280/150 SB; 297/388

[56] References Cited
UNITED STATES PATENTS

| | | | |
|---|---|---|---|
| 3,837,594 | 9/1974 | Lewis | 242/107.4 |
| 3,838,832 | 10/1974 | Romanzi | 242/107.4 |
| 3,873,041 | 3/1975 | Rumpf et al. | 242/107.4 |

*Primary Examiner*—Stanley N. Gilreath
*Assistant Examiner*—John M. Jillions
*Attorney, Agent, or Firm*—Miller, Morriss, Pappas & McLeod

[57] ABSTRACT

A vehicle sensitive inertial retractor for safety belting and the like which includes a frame or base supporting a webbing receptacle in the form of a spring motor loaded reel or drum and biased to rewind. The frame also supports a saddle and the saddle provides a fulcrum seat for an inertially displaceable pendulum mass. A lever, pivotal in the frame is positioned to engage the pendulum in a following relation and a finger portion of the lever holds a face clutch plate against movement corresponding to the outgoing of the adjacent drum or reel which accompanies withdrawal of webbing. The clutch plate includes a cam portion which normally blocks a spring biased pawl bar from lock engagement with ratchet wheels on the reel or drum. Clutch rotation limiting means are also provided in the frame of the retractor restricting the extremes of rotation of the clutch plate in the manner of a stop. The retractor construction is of the inertial locking type in which a mass displaces a lever and the lever thereupon frees a face type friction clutch for limited rotation with the drum of the retractor. Upon the limited displacement of the clutch, the blocking cam is moved away from blocking relation with the spring loaded pawl bar and the pawl bar thereupon pivots in the retractor frame to engage the ratchet teeth on the drum flanges and thus preventing any further withdrawal of webbing from the retractor. As a consequence, webbing is freely withdrawn from and retracted onto the retractor reel except under sensed inertial imbalance.

7 Claims, 6 Drawing Figures

FACE CLUTCH VEHICLE SENSITIVE INERTIAL RETRACTORS

The present invention is a new and improved vehicle sensitive inertial locking retractor in which a face clutch element is prevented from following the withdrawal rotation of webbing from a reel or drum until such time that inertial forces (as from sudden braking or impact of the vehicle) cause displacement of a depending mass and consequent unblocking of the clutch and accompanying movement of the pawl bar. The depending mass causes dislodgement of a simple lock and continuing withdrawal rotation of the webbing or harness drum allows the spring loaded pawl bar to rock into engagement with ratchet teeth which move with the reel or drum. This stops the drum and provides a balanced lock against further withdrawal until inertial balance is restored and some retraction has occurred. The face clutch which is blocked from following the withdrawal rotation of the drum by the removal of the lock is a friction disc in facing frictional engagement with the moving drum and the clutch plate includes a radial cam-nose extension. While a face clutch which selectively cams a pawl element out of engagement with a ratchet is relatively well known to locking type retractors, such a system is not known heretofore to admit of usage in an inertial locking retractor environment.

Locking type retractors are non-inertial and are retractors for seat belting or webbing in which the pawl element is placed into locking relation with the retractor after a certain amount of webbing has been withdrawn and a slight retraction has occurred, usually consequent to buckling the terminal outer end of the webbing to associated harness hardware or buckle. In such retractors any outward movement of webbing after lock-up is blocked until the system is recocked.

Seat belt retractors are relatively well known in the art and are drum-like receptacles in a frame and the drum holds belting, webbing, or cable material and the retractors are useful, for example, in automobiles, boats, or aircraft to store seat belt webbing cable or harness when not in use and to allow withdrawal of selected lengths when applied to support various sizes of vehicle drivers or passengers, for example. The drum or reel is equipped with a spring retractor motor biasing the drum to wound-up condition. The spring motor is usually attached to the frame and to the shaft of the drum or reel. Thus, withdrawal of webbing from the reel energizes the spring motor and release of the webbing causes the motor to rewind the webbing on the drum or reel. Where the retractors are to be locked against withdrawal ratchet means are usually and preferably attached to the drum and move with the drum. The best form of ratchet is in the form of ratchet flanges at the ends of the drum which confine the webbing and include perimeter ratchet teeth. A pawl is provided in the form of a bar pivotal in the frame and which is biased toward the ratchet and locks the ratchet and drum against withdrawal of webbing when it engages the teeth of the ratchet. On rewind, the pawl is freely passed since the heel of the teeth pushes past the pawl in the rewind direction. In the locking type retractors, after slight retraction, the pawl is armed to lock against any further withdrawal. Examples of such locker type retractors are seen in the U.S. Pat. Nos. 3,174,704 to Replogle, Wohlert 3,412,952 and Fisher 3,667,698.

The present retractor, however, is an inertial locking type retractor which allows the user or passenger to freely move the webbing, belting or cable and connected harness in or out of the retractor or on or off of the drum unless an inertial imbalance occurs to displace a mass. For this reason, the present invention is a vehicle sensitive structure requiring the imbalance of a mass as by sudden acceleration, deceleration, or impact of the vehicle before locking against withdrawal. Such structures using vertical depending pendulums as the mass are represented generally in the art by the U.S. Pat. Nos. 3,495,786 to Hemens; Kell 3,508,720; or Kovacs 3,489,367. Unlike the present invention, the usual vehicle sensitive inertial locking retractors act directly to move the pawl element into blocking engagement with a ratchet on the drum. By contrast, the present invention responds to inertial imbalance through a face clutch which is normally restrained from following rotation of the drum. While under such restraint the same clutch element blocks the pawl element from engagement with the teeth of the ratchet.

When inertial imbalance occurs, the restraint of the face clutch is removed and the face clutch may then follow limitedly the movement of the drum and the cam portion of the clutch releases a spring loaded pawl so that the pawl can act on the ratchet teeth of the reel to effectively block further webbing withdrawal. No such inertial conceptions are known in the art prior to the present invention with its attendant advantages.

Accordingly, the principal object of the present invention is to provide a face clutch vehicle sensitive inertial locking retractor which allows total freedom of movement of the user or passenger until an impact or inertial imbalance is felt by an inertial sensor such as a pendulum-like mass.

A second object is to provide a new and improved simplified inertial retractor of a friction clutch type and wherein the face clutch cam blocks the pawl element from locking unitl the clutch can move responsive to drum rotation and in which the rewind is totally silent because the cam portion of the clutch on rewind disengages the pawl from contact with the ratchet structure.

A third object is to provide a seat belt retractor in which a pendulum element under conditions of inertial balance restrains a friction clutch and a cam lobe on the clutch plate holds a pawl bar out of ratchet engagement. Under conditions of pendulum sensed inertial imbalance the clutch restraint is removed and the pawl bar is released to lockably close on the ratchet elements.

Another object is to provide a simple trouble-free inertial locking retractor in which the pawl is indirectly acted upon by the inertial element.

Other objects such as increased stress bearing capability, containment in the retractor frame, and reduction in retractor cost for inertial retractors will be appreciated as the description proceeds.

IN THE DRAWINGS

GENERAL DESCRIPTION

Figure 1:
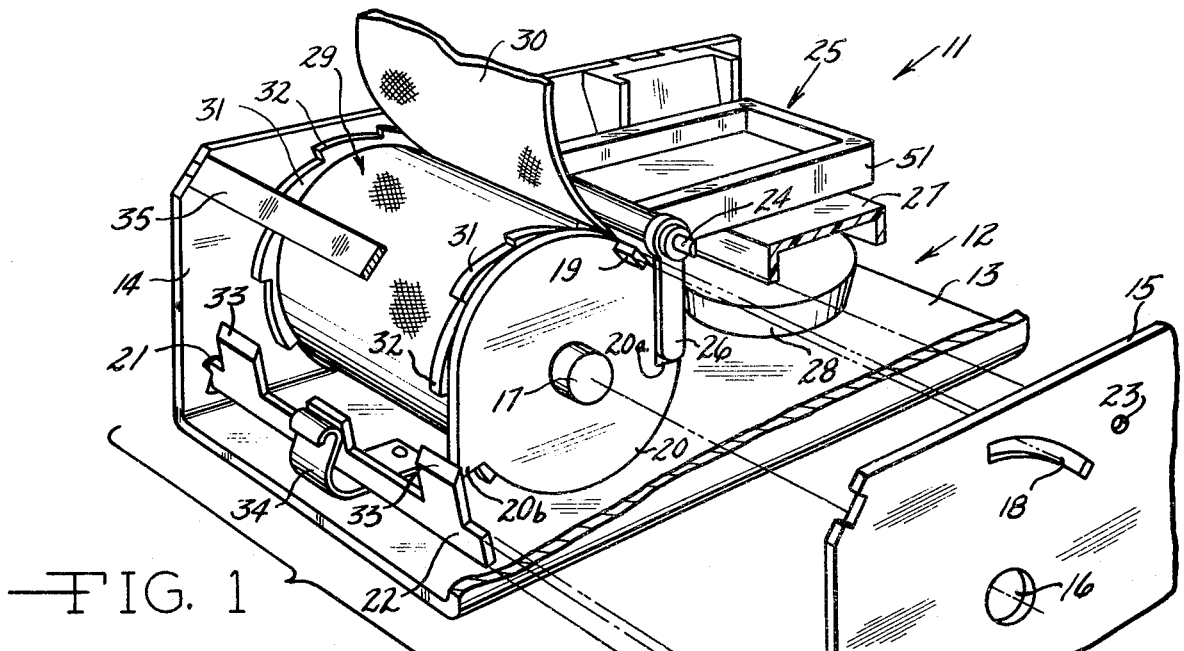
FIG. 1 is a partially cut away and partially exploded perspective view of a vehicle sensitive inertial locking retractor in accord with the present invention, the near wall being partially exploded to reveal the clutch-cam-lever relationship.

In general, the vehicle sensitive retractor of the present invention is a retractor which includes a drum or reel mounted for rotation in a frame. The reel is spring biased for retraction of webbing. The drum is provided with a ratchet having teeth which move as the drum moves. A pawl is also provided in the frame parallel to the axis of the drum and the pawl is spring biased toward contact with the ratchet. When the pawl engages the teeth of the ratchet, the drum is locked against further rotation and withdrawal of webbing is prevented. A limited movement face clutch in the form of a plate is provided which is in frictional drive relation with one of the drum flanges and the clutch is urged to rotate as the drum rotates. As withdrawal of webbing occurs, the friction between flange and clutch plate tends to drag the clutch in the same direction as the direction of drum movement. As retraction occurs, an opposite movement in the drum caused by the rewind motor tends to drag the clutch plate in the same retraction direction of movement as the drum. The amount of movement of the clutch is limited. In the withdrawal extreme of movement, a cam portion of the clutch plate relases the pawl to lockably engage the ratchet unless the clutch plate is restrained. In the retraction extreme, the same cam portion of the clutch moves to disengage the pawl from the ratchet, and holds the pawl out of engagement with the ratchet until impact or sudden deceleration of the vehicle accompanied by webbing movement causes dislodgement of the blocking lever. The movement of the clutch and clutch cam then frees the pawl so that in obedience to the spring bias it can close and lock against the ratchet means. The impact or sudden braking causes a vertically depending inertial mass to act on the face clutch and under normal or minimal inertial condition, the mass, through a lever, holds the clutch in the pawl blocking relation. On the inertial imbalance caused, for example by impact, the mass shifts omnidirectionally to release the clutch from restraint and with any accompanied tendency for webbing withdrawal from the drum, the clutch can move along with the cam portion and the pawl bar is freed of the cam blockage and can lockably engage the ratchet in prevention of further webbing withdrawal from the drum.

The retractor comprises a frame of generally U-shaped cross section configuration and between the side walls of which is a storage drum for harness material such as webbing, belting, or cable, for example. The shaft of the drum is operably supported or journalled in the upstanding legs of the frame and one end of the shaft is attached to a retractor spring motor which is biased to rewind the harness material on the drum or reel. The other end of the spring motor is secured to the frame. The drum or reel is provided with at least a single ratchet and preferably a pair of ratchets in the form of teeth cut into the periphery of drum flanges. Coaxially on the shaft of the drum at one end is a cam-clutch plate. The cam-clutch plate is urged axially into friction engagement with the adjacent drum flange by an axial compression spring over the shaft and acting against the side wall of the frame at one end and against the cam-clutch at the other end. A radial protruberance is provided in the periphery of the cam-clutch and the protuberance is ramped to disengage the pawl element when the cam-clutch is following the retraction of the drum or reel. A ledge or step-like notch is provided in the cam-clutch at the periphery thereof. A motion limiting element such as a lug, extends transversely from the face of the clutch and into an arcuate slot in the frame and assures two extremes of arcuate travel of the cam-clutch. On rewinding or retraction, the cam protuberance engages the pawl urging and holding it away from ratchet engagement. On motion of the clutch accompanying impact or sudden deceleration causing withdrawal movement of the drum, the cam protuberance on the clutch shifts out of engagement with the pawl and allows the pawl to strike the ratchet teeth in lock relation in restraint of further withdrawal of webbing. The pawl is spring loaded in the direction of tilting closure against the ratchet teeth and on engagement with the teeth transmits lock stresses into the frame.

Associated in the frame and supported thereby so as to depend vertically in any installation is a pendulum-like inertial mass, the upper end of which omnidirectionally acts on a lever pivotally supported by the frame and the lever includes a connected finger which is aligned to blockingly enter the step-like notch in the cam-clutch. On displacement of the dependiing mass, in any direction, the lever is moved upward. This rocks the blocking finger out of the step-like notch and thereby allows the cam-clutch plate, under the influence of frictional engagement with the drum, if webbing or harness material is withdrawn therefrom, and thus the pawl is allowed to close upon the teeth of the ratchet.

SPECIFIC DESCRIPTION

Referring to the drawings and in particular the FIG. 1 thereof, the invention is embodied in vehicle sensitive inertial locking retractor 11. The frame 12 is channel shaped, the web portion 13 provides a horizontal mounting base in the embodiment shown and the integral upstanding legs 14 and 15 provide journal supports at the opening 16 for the drum shaft 17, an accurate slot 18 forming a travel limiting stop for the lug 19 in the cam-clutch plate 20, pivot support openings 21 for the pawl bar 22 and journal support at opening 23 for fulcrum 24 of the lever 25 which includes the blocking finger 26. The pendulum saddle 27 also bridges between the legs 14 and 15 of the frame 12 and, as will be seen, provides an omnidirectional mount for the inertial sensing means shown as a pendulum with vertically depending mass 28. The drum or spool 29 on which belting or webbing 30 is wound is fixed to and rotates with the shaft 17. The webbing 30 is laterally confined by the ratchet faced end flanges 31 which are a part of the spool 29. The ratchet faced flanges 31 are provided with perimeter teeth 32. The pawl extensions 33 of the pawl bar 22 are in registry relationship with the ratchet face flanges 31 so that as the bar 22 is tilted into contact with the teeth 32 no further withdrawal of webbing 30 is possible and the drum 29 is thus locked against rotation which might allow withdrawal of webbing 30. The pawl bar 22 is acted on by a spring 34 which is shown secured to the web portion 13 of the frame 12. The spring 34 urges the pawl bar toward the teeth 32 of the ratchet wheels 31. The cam-clutch 20 is a face clutch from an operative point of view since it is free to rotate on the shaft 17 limited to the movement permitted by the lug 19 in the arcuate slot 18. The cam-clutch plate 20 is urged axially into contact with one of the ratchet faced flanges 31 on the drum 29, as shown. The plate 20 is frictionally driven by the movement of the drum 29 and corresponding movement of the flange 31. The friction is enhanced by an axial spring (FIG. 2) which is over the shaft 17 and engages the clutch plate 20 and the upstanding leg 15. The cam-clutch element 20 is provided with a shoulder or notch 20a against which the finger 26 rests in prevention of rotation of the clutch element 20 during withdrawal of webbing 30 from the drum 29. When the finger 26 is removed from the notch 20a, the clutch plate 20 may rotate, limited by slot 18, and then the cam nose 20b of the plate 20 correspondingly rotates allowing the pawl bar 22 access to the ratchets 31. When this happens, no further withdrawal of webbing 30 can occur. The spacer bar 35 braces the legs 14 and 15 against possible deformation and strengthens the frame 12. A spring motor (spiral spring) is provided to achieve retraction of the webbing 30 and the drum 29. The spring motor, as will be seen, applies a rotational bias urging the drum 29 to rewind all webbing, belting, or cable onto the drum 29 and as rewinding or retraction of the webbing 30 occurs, the ramped or heel portion of the ratchet teeth 32 kick the pawl element 22 back against the spring 34 and the following tendency of the clutch plate 20 locates the cam nose portion 20b as seen in the FIG. 1 for quiet further recovery or recoil of all slack webbing 30 and in preparation for further withdrawal free of the pawl 22 until inertial displacement reocurrs.

Figure 2:
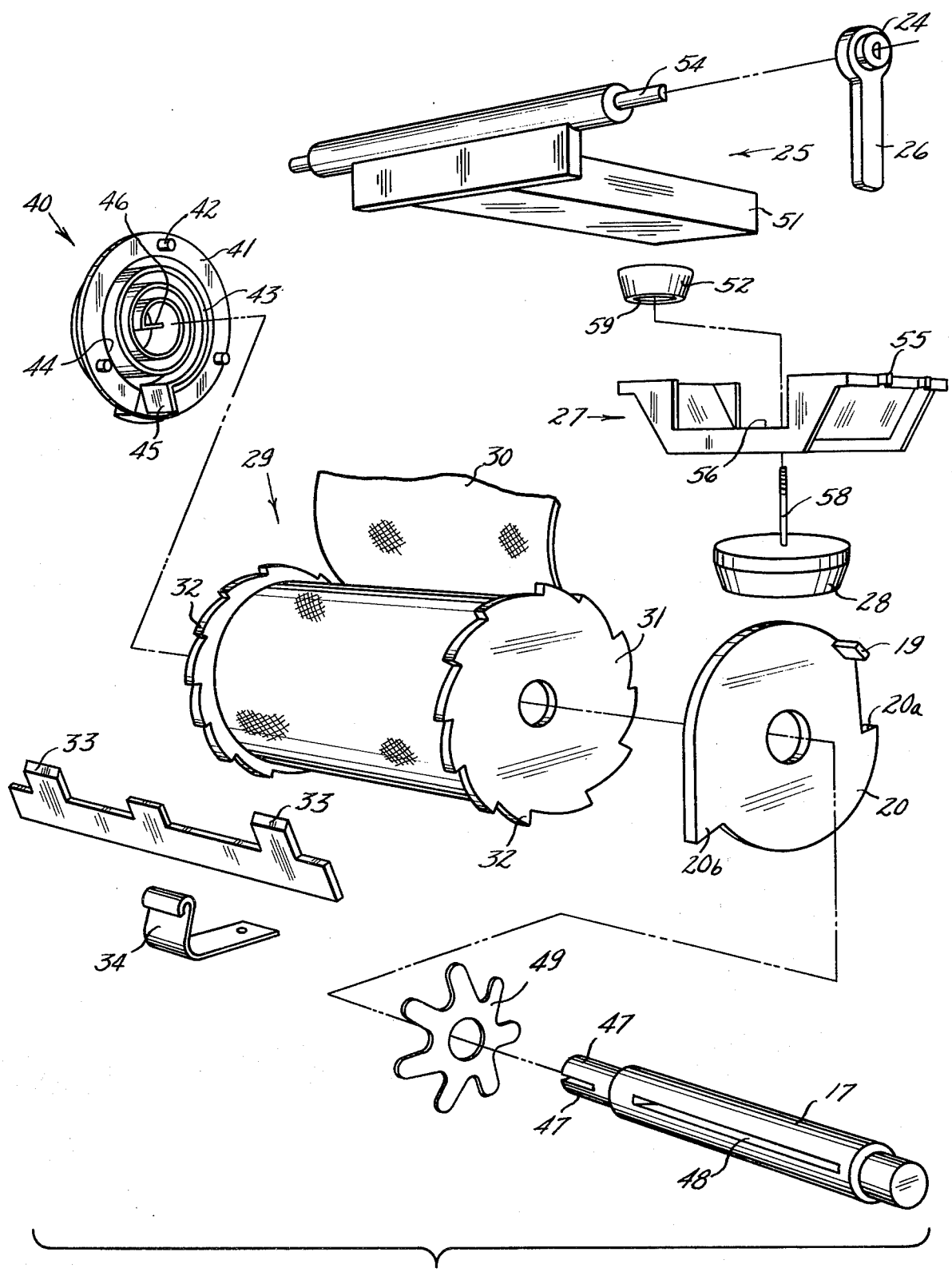
FIG. 2 is a fully exploded perspective view of the structure seen in FIG. 1 with exception of the frame and revealing the simplicity of the assembly.

In FIG. 2, the assembly relationship of elements is best described independently of the supporting frame 12. The spring motor 40 is revealed by removal of the upstanding leg 14 of the frame 12 to which the spiral spring case 41 is attached as by the integral rivet extensions 42 which insert in corresponding openings in the leg 14. The spiral flat spring 43 is positioned in the cavity 44 of the case 41 and the outboard end 45 is buttressed against the case 41 in prevention of rotation. The inner end 46 of the spring 43 is turned in as shown to provide an operative connection to the shaft 17 between the bifurcations 47 thereof. When webbing 30 is fully retracted, the spring 43 is most relaxed. As webbing 30 is withdrawn from the drum 29, the shaft 17 affixed to the drum 29 and to the webbing 30 as by the webbing slot 48 or otherwise turns and tightens the spiral spring 43 in the spring motor 40. When webbing 30 is released it is rewound by the motor 40 or retained, as by buckling of harness around a user against the spring bias of the motor 40. The cam-clutch plate 20 is frictionally urged to follow the rotation of the drum 29 by its adjacent frictional contact with the flange 31, as shown. The axial spring 49 acts, as previously indicated, between leg 15 and plate 20 to assure good following contact. The lug 19 limits the amount of follow by the plate 20 by virtue of the extremes of arcuate travel established by the arcuate slot 18.

As retraction occurs, the clutch plate 20 locates the notch 20a (as seen in the FIG. 1) in position to receive the blocking finger 26 of the lever 25 thus preventing the clutch plate 20 from following movement in the direction of the drum 29 during withdrawal of webbing 30. The lever 25 is comprised of the pad portion 51 which extends over the saddle 27 and rests in contact with the displaceable top or crown 52 of the pendulum unit 53. The fulcrum 24 of the lever 25 is journalled as previously described in the frame 12 and the finger 26 is keyed onto the journalled fulcrum element 24 so that it is a part of the lever 25. The key is, in fact, an out-of-round stub 54 passed through a mating opening in the finger 26. The saddle 27 is a platform secured between the legs 14 and 15 of the frame 12 as by detent means 55 in suitable receptacles formed in the legs 14 and 15 of the frame 12. The intermediate or stage portion 56 of the saddle 27 is horizontally oriented and is provided with a central opening therethrough which is in clearance relation to the threaded pendulum shaft 57. The pendulum shaft 57 extends upward and the threads 58 are engaged with mating threads in the crown piece 52. A slight circular boss is preferred around the pendulum opening to provide omnidirectional sensing and the boss mates with the annular indentation 59 in the crown 52 so that as the mass 28, connected to the lower end of the pendulum shaft 58, is displaced, the crown 52 tilts with the movement of the mass 25 and in turn displaces the lever 25 upwardly. As seen, the described inertial sensor is omnidirectional and inertial imbalance from any direction having a vector acting in the horizontal plane of the automobile will cause displacement of the crown 52 and consequent movement of the lever 25 as the crown 52 rises on the stage 56 and pushes on the pad portion 51 of the lever 25. As the lever 25 tilts, so the finger 26 is moved correspondingly unblocking the clutch plate 20 and with any withdrawal of webbing 30 the drum 29 can be locked against rotation automatically because the spring loaded pawl 22 can now reach the ratchet teeth 32 and because the cam nose portion 20b is removed by rotation of the plate 20 from blocking the access of pawl 22 to ratchet teeth 32. On retraction, clutch 20 relocates following the frictional drag of the drum movement and the ratchet teeth 32 kick the pawl bar 22 out of the lock relation and the restored inertial balance (causing the pendulum to hang vertically) relocks the clutch 20 to allow free withdrawal and retraction subject only to the resistance of the spring motor 40 as in FIG. 1.

The saddle 27, the lever 25 including the fulcrum portion 24 and finger 26 may be molded from suitable dimensionally stable resin or plastic in substantial reduction of cost and weight. By injection molding of the saddle 27, lever 25 and finger 26, high production and accuracy is possible. By utilization of appropriate molding techniques, the lever 25 and finger 26 may be made integral but assembly is facilitated by using the separate finger 26 and pivot shoulder 24. The stem or shaft 58 extending upward from the mass 28 adjusts the pendulum 53 as to sensitivity. As can be appreciated by reference to FIG. 2, the assembly in the channel frame 12 of the drum or reel 29 with the shaft 17 connected to the spring motor 40 on one end and the other end of the shaft 17 receives the face type cam-clutch 20 and the spring 49 positioned between the frame 12 and the clutch plate 20, the travel limiting lug 19 extending into the arcuate slot 18 in the frame 12. The pawl 22 and spring 34 are mounted in the frame 12 biasing the bar pawl 22 toward the ratchet teeth 32 on the webbing drum 29.

Figure 3:
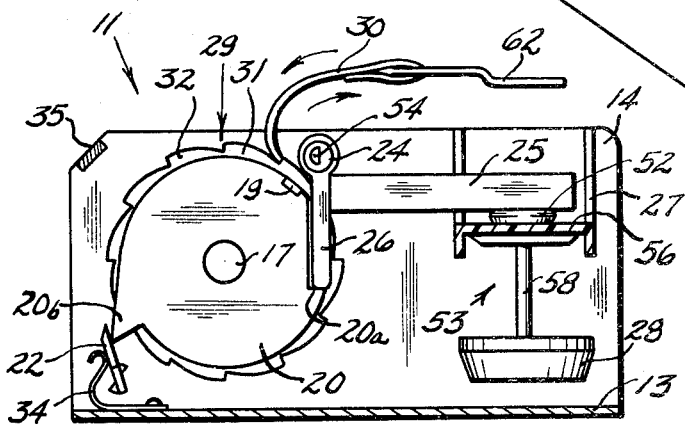
FIG. 3 is a full section side elevation view of the present invention taken on the line III—III of FIG. 4.
Figure 4:
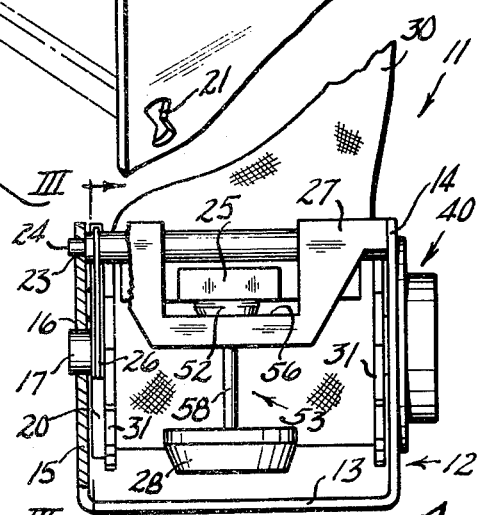
FIG. 4 is an end elevation view of the present invention with the saddle partially broken away to reveal the locking lever engaged with the cam clutch plate.
Figure 5:
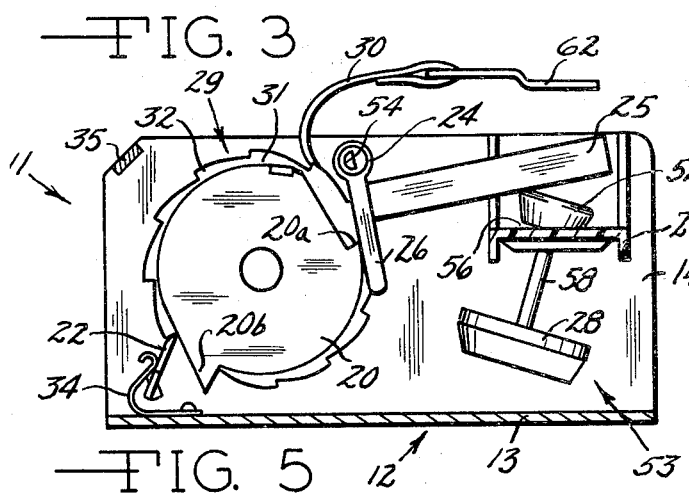
FIG. 5 is a side elevation section view as in the FIG. 3 but indicating the result of inertial imbalance as occurs on impact or sudden braking of the vehicle in which the retractor is positioned.
Figure 6:
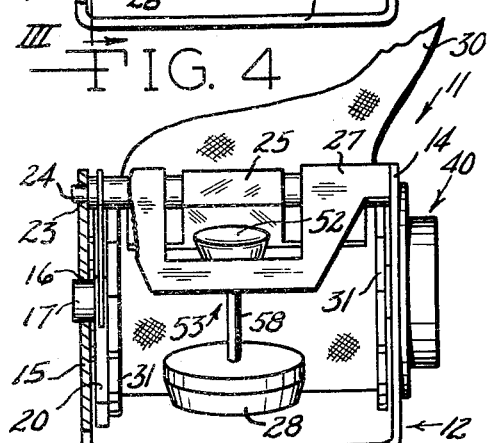
FIG. 6 is an end elevation view as in FIG. 4 and showing the pendulum displacing the lever.

FIG. 3 best shows the retractor 11 of the present invention in its normal position so that webbing 30 can be freely withdrawn and retracted from or onto the drum or reel 29. The clutch plate 20, while frictionally in contact with the ratchet flange 31, is restrained from movement during withdrawal of webbing 30 by the finger 26 in the notch 20a and through the lever 25 bearing on the top of the crown or head 52 of the vertically depending pendulum 53. The lug 19 is immediately adjacent one end of the arcuate slot 18 in the position as shown and the pawl bar 22 cannot close on the teeth 32 of the ratchet wheels 31 because the cam nose 20b blocks the spring loaded pawl 22. A buckle tongue 62 is shown secured to the end of the webbing or harness 30. In FIG. 4 the situation seen in FIG. 3 is further represented, the pendulum 53 in depending position through the stage 56 of the saddle 27. The FIGS. 5 and 6, then illustrate what occurs in the retractor 11 when inertial imbalance is sensed by the pendulum-sensor. As previously described, any imapct or sudden braking of the vehicle in which the retractor 11 is located will result (if within the sensitivity of the sensor) in a tilting of the pendulum 53 and the crown or head 52 of the pendulum 53 correspondingly and omnidirectionally tilts thereby applying a force to the lever 25 which lifts the lever 25 as indicated and withdraws the blocking finger 26 from the notch 20a in the clutch plate 20 and thereupon the clutch plate 20 rotates on the shaft 17 as urged by frictional engagement with the ratchet flange 31 to the limit of travel of the lug 19 moving in the slot 18 of the frame 12 (see FIG. 1 for slot 18). Any consequent withdrawal of the webbing 30 from the reel 29 as would result from the same impact or inertial imbalance as sensed by the pendulum 53 results in lock-up of the drum 29 since the pawl bar 22 now engages its pawl extensions 33 with the ratchet wheels 31 and prevents further withdrawal. The pawl bar 22 can achieve this because the cam-nose 20b is rotated from its normal guarding relationship. The FIGS. 5 and 6 show the locked condition of the drum or reel 29. The lug 19 in the situation of FIGS. 5 and 6 is located at the opposite extreme of travel from the situation seen in FIGS. 3 and 4.

When the inertial balance is restored (by restoration of vertical dependency of the pendulum 53) and retraction of webbing 30 commences urged by the spring motor 40, the movement of the teeth 32 on the flanges 31 kicks the pawl bar 22 back against its spring 34 and the cam-nose 20b moving in a following movement with the clutch plate 30 and drum 29 relocates in its pawl blocking position as seen in the FIGS. 3 and 4 and the braking finger 26 drops into the notch 20a so that full freedom of movement of the webbing 30 is then available.

In operation, retractors in accord with the foregoing description perform well and at costs comparable or lower than most previously known locking retractors while extending freedom of movement to the users until the sensing of an inertial imbalance.

While a complete and full description of the construction and operation of one embodiment of the present invention has been made, those skilled in the art will appreciate that variations in the construction of the frame to accommodate particular mounting difficulties is possible without departure from the invention. For example, the web of the frame is indicated as horizontal and the pendulum depends transversely thereof. It would accordingly be obvious to reposition the pendulum structure in respect to the frame so long as in its rest position it depends vertically. In like manner, the pawl structure and its spring may be relocated in the frame as convenient to a particular vehicle or condition. In such relocations of parts, it would be obvious to relocate the notch or buttress serving the blocking finger and to relocate on the clutch plate the cam-nose to achieve blocking of the pawl simultaneously with the blocking of the clutch plate by the finger.

Having thus described in detail a preferred operative embodiment of the invention herein, other changes, improvements and modifications within the skill of the art are intended to be included in the spirit of the present invention limited only by the scope of the hereinafter appended claims.

We claim:

1. A face clutch vehicle sensitive inertial retractor for dispensing and retracting webbing and the like for safety harness usage comprising:

a frame supporting a drum with webbing and drum retracting motor, said drum on a shaft and said shaft driven by said motor and said drum including at least one ratchet face, a pawl tiltably supported by said frame and a spring urging said pawl toward locking engagement with said ratchet as webbing is withdrawn from said drum;

a mass movable omnidirectionally on application of inertial forces and supported by said frame;

a lever normally engaged with said mass and movable by said mass upon inertial displacement of said mass;

a finger element extending from said lever and movable as said lever is moved;

a face clutch plate in coaxial relation with said drum and frictionally driven thereby, said clutch plate having a step-like notch in the periphery thereof engaged by said finger, a cam-like integral extension of said face clutch plate extending radially therefrom in an engagement path with said pawl urging and holding said pawl out of engagement with said ratchet when said finger is in said notch and when said drum is retracting, and a movement limiting stop extending from said clutch plate to engage said frame and said plate thus limited in one direction to engage said finger in said notch and limited in withdrawal direction of said drum to a position of said cam-like extension out of engagement with said pawl.

2. In a vehicle sensitive inertial retractor for safety belt harness and the like, having a frame, a webbing dispensing and retracting drum rotatably supported by the frame, a spring motor driving said drum to retraction of webbing, a ratchet secured to said drum and rotating therewith, a pawl supported by said frame and tiltable toward and away from lock engagement with said ratchet in prevention of withdrawal, and a spring biasing said pawl toward said ratchet, the combination comprising:

a pendulum-like mass supported in said frame for omnidirectional movement;

a lever engaged with said pendulum-like mass and moved by said mass when said mass is inertially displaced;

a finger secured to said lever and moved by said lever as said mass is displaced; and a face clutch plate element in frictional engagement with said drum and said clutch plate element having a stop engageable with said frame being thus limitedly movable in accord with movement of said drum, said clutch element having an integral cam extension which engages and pushes said pawl out of engagement with said ratchet on retraction movement of said drum at one extreme of clutch plate movement and said clutch plate element having a step-like notch in the periphery thereof engaged by said finger in prevention of rotation of said clutch during withdrawal movement of said drum until said finger is released from said step-like notch.

3. The combination as set forth in claim 2 and including a compression spring between said frame and said clutch urging axial frictional engagement as between said drum and said clutch.

4. In the combination of claim 2 wherein the motion limiting stop comprises a lug transversely extending from said clutch into an arcuate opening defined in said frame whereby said lug limits the following movement of said clutch to the extremes defined by said arcuate opening.

5. A face clutch lock for a seat belt drum retractor comprisng:

a ratchet movable with said drum; a pawl supported on the retractor; a spring for urging said pawl into locking engagement with said ratchet in a belt withdrawal direction;

a mass secured to said retractor responding by relative omnidirectional movement to inertial imbalance of forces;

a lever engaging said mass and movable as said mass moves;

a finger extending from said lever;

a notched face clutch plate having movement limiting stops and frictionally engaged with said drum for limited movement by said drum during withdrawal and retraction movement of said belt, said face clutch plate restrained by said finger in said notch from movement during withdrawal until said finger is displaced by movement of said lever and said mass, and a pawl displacing cam surface radially and integrally extending from said clutch plate in selected contact with said pawl and holding said pawl from said ratchet during retraction movement of said belt and when said mass is at rest and said finger is restraining said clutch plate.

6. In the claim 5 the combination wherein said face clutch plate is coaxial and adjacent to said drum and including a compression spring, said spring urging frictional contact between said clutch and said drum.

7. A vehicle sensitive inertial retractor having a webbing dispensing drum, in a frame, a rewind motor, ratchet wheels movable with said drum, a pawl, and a spring for urging said pawl into locking engagement with said ratchet wheels in a webbing withdrawal direction the combination comprising:

a face clutch plate axially engaged against said drum for drum following movement and having an integral cam-nose engageable to block said pawl and movement limiting means extending from said clutch plate to engagement with said frame and said face clutch plate including an integral notch portion; and vertically depending displaceable inertia means engaging said notch of said clutch plate whereby said clutch plate is restricted in following movement of said drum and on displacement from vertical dependency disengaging said notch and freeing said clutch plate to follow said drum whereupon said cam-nose portion of said face clutch plate disengages from blocking said pawl and said drum is locked against further rotation by reason of said pawl engaging said ratchet wheels.

* * * * *